United States Patent
Sadamitsu et al.

(10) Patent No.: US 7,304,147 B2
(45) Date of Patent: Dec. 4, 2007

(54) AZO COMPOUND AND SALT THEREOF

(75) Inventors: Yuichi Sadamitsu, Tokyo (JP); Kazuyuki Kawabe, Saitama (JP)

(73) Assignees: Nippon Kayaku Kabushiki Kaisha, Tokyo (JP); Polatechno Co., Ltd., Inamasu (JP)

( * ) Notice: Subject to any disclaimer, the term of this patent is extended or adjusted under 35 U.S.C. 154(b) by 237 days.

(21) Appl. No.: 10/552,184

(22) PCT Filed: Apr. 15, 2004

(86) PCT No.: PCT/JP2004/005364

§ 371 (c)(1),
(2), (4) Date: Oct. 6, 2005

(87) PCT Pub. No.: WO2004/092282

PCT Pub. Date: Oct. 28, 2004

(65) Prior Publication Data

US 2007/0079740 A1    Apr. 12, 2007

(30) Foreign Application Priority Data

Apr. 16, 2003    (JP)    .............. 2003-111419

(51) Int. Cl.
C09B 31/20    (2006.01)
C09B 45/28    (2006.01)
G02B 5/30    (2006.01)
F21V 9/14    (2006.01)

(52) U.S. Cl. .............. 534/704; 534/754; 534/763; 252/585; 359/491

(58) Field of Classification Search ............. 534/704, 534/754, 763; 252/585; 359/491
See application file for complete search history.

(56) References Cited

U.S. PATENT DOCUMENTS 2,671,775 A * 3/1954 Hanhart ............. 534/755

FOREIGN PATENT DOCUMENTS

| | | |
|---|---|---|
| CH | 326553 | 12/1957 |
| GB | 1 484 732 | 9/1977 |
| JP | 50-50426 | 5/1975 |
| JP | 60-63258 | 4/1985 |
| JP | 60-156759 | 8/1985 |
| JP | 2001-33627 | 2/2001 |
| JP | 2002-220544 | 8/2002 |
| JP | 2002-275381 | 9/2002 |
| JP | 2002-296417 | 10/2002 |
| JP | 2003-64276 | 3/2003 |
| WO | 01/06281 | 1/2001 |

OTHER PUBLICATIONS

Chinese communication dated Feb. 16, 2007, with an English translation.
Partial translation of "Dye Chemistry" by Yutaka Hosada; Nov. 30, 1957 p. 634.
The International Search Report dated Jun. 15, 2004.

* cited by examiner

Primary Examiner—Fiona T Powers
(74) Attorney, Agent, or Firm—Nields & Lemack

(57) ABSTRACT

The present invention relates to an azo compound represented by the following formula (1):

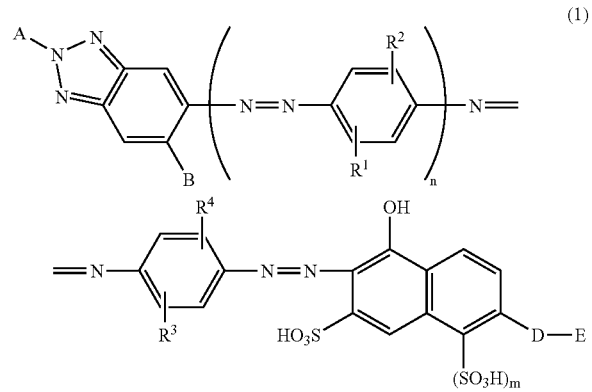

wherein A denotes a phenyl group having 1 to 3 substituents such as sulfonic acid group, amino group, lower alkyl groups and lower alkoxyl groups, or a naphthyl group, B denotes hydrogen atom, sulfonic acid group, a lower alkyl group, a lower alkoxyl group or the like, each of $R^1$ to $R^4$ independently denotes hydrogen atom, a halogen atom, a lower alkyl group, a lower alkoxyl group or the like, D denotes —NHCO—, —N=N— or —NH—, E denotes hydrogen atom, a lower alkyl group or a phenyl group having 1 to 3 substituents such as hydroxyl group and amino group, n denotes 0 or 1, and m denotes 0 or 1, or a salt thereof, or a copper complex compound of either of them, which is used for a polarizing plate having excellent polarization performance and durability and furthermore little color leakage in visible light range.

13 Claims, No Drawings

AZO COMPOUND AND SALT THEREOF

TECHNICAL FIELD

The present invention relates to an azo compound and the salt thereof, and to a novel dye type polarizing film containing either of them.

BACKGROUND ART

A polarizing plate having function of transmitting and shielding light as well as a liquid crystal having switching function of light, serve as a fundamental constitutional element of a display device such as a liquid crystal display (LCD). Application field of this LCD has been expanded from initial small items such as electronic calculator and clock to a wide range of equipments such as portable personal computer, word processor, liquid crystal projector, liquid crystal television set, car navigation system, and indoor and outdoor measurement hardwares. Accordingly, because of use under broad conditions of low temperature to high temperature, low humidity to high humidity, and low light intensity to high light intensity, there has been demanded a polarizing plate having high polarization performance and excellent durability.

At present, a polarizing film is generally prepared by adsorbing or incorporating iodine or a dichromatic dye as a polarizing element in a polarizing film base material such as a stretched and orientated film of polyvinyl alcohol or the derivative thereof or a orientated polyene type film produced by dehydrochlorination of polyvinyl chloride film or dehydration of a polyvinyl alcohol type film. Among them, an iodine type polarizing film using iodine as a polarizing element is excellent in initial polarization performance but weak to water and heat, and has problem in its durability when it is used for a long time under the condition of high temperature and high humidity. In order to improve durability, a method of treating an iodine type polarizing film with formalin or an aqueous solution containing boric acid, or using a polymeric film having a low moisture permeability as a protective film, or the like is considered, but its effect does not seem to be sufficient. On the other hand, a dye type polarizing film using a dichromatic dye as a polarizing element is excellent in humidity resistance and heat resistance but generally not sufficient in initial polarization performance as compared with an iodine type polarizing film.

In neutral color or gray polarizing films produced by adsorbing some kinds of dichromatic dyes in a polymeric film and orientating it, the state (cross position) wherein two polarizing films are superimposed on each other so that their orientation directions can be crossed at right angles, may cause light leakage (color leakage) of a specific wavelength in the wavelength range (400 to 700 nm) of visible light. If such color leakage is caused, when polarizing films are fitted to a liquid crystal panel, in some cases the color of liquid crystal display changes in the dark state. Thus, it is demanded to prevent the color change of liquid crystal display due to color leakage of a specific wavelength in the dark state when polarizing films are fitted to a liquid crystal display device. In order to prevent the color change, in neutral color polarizing film produced by adsorbing some kinds of dichromatic dyes in a polymeric film and orientating it, it is necessary to uniformly lower the transmittance at cross position (cross transmittance) in the wavelength range of visible light.

Furthermore, in the case of a color liquid crystal projection type display, that is, a color liquid crystal projector, a polarizing plate is used for the liquid crystal image-forming part thereof, and formerly there had been used an iodine type polarizing plate having good polarization performance and expressing neutral gray. As mentioned above, an iodine type polarizing plate uses iodine as a polarizer and hence has a problem in that light resistance, heat resistance and wet heat resistance are not sufficient. In order to resolve the problem, a neutral gray polarizing plate using as a polarizer a dye type dichromatic coloring matter has come to be used.

However, in a neutral gray polarizing plate, in order to averagely improve polarization performance and transmittance in the entire wavelength range of visible light, usually coloring matters of three primary colors are used in combination. Therefore, transmittance of light is bad to the requirement of the marketplace that more brightness should be realized as in a color liquid crystal projector, and there is a problem that in order to realize brightness it is necessary to make light intensity at the source higher. Thus, in order to improve transmittance of light, three polarizing plates corresponding to three primary colors, that is, for blue channel, for green channel, and for red channel have come to be used. However, for the reason that light is highly absorbed by polarizing plates, the reason that an image having a small area of 0.9 inches to 6 inches is expanded to approximately several dozen inches to one hundred and several dozen inches, and the other reasons, reduction of brightness cannot be avoided, and therefore a light source of higher brightness is used. Furthermore, improvement requirement for more brightness of a liquid crystal projector is deep-seated, and consequently light intensity at the source used has grown stronger of itself.

As a dye used for preparation of a dye type polarizing film as mentioned above, there is cited a water-soluble azo compound disclosed in, for example, JP-A-2001-33627, JP-A-2002-220544, JP-A-2002-275381, JP-A-2002-296417, JP-A-2003-64276 or the like.

However, the conventional polarizing plates containing said water-soluble dyes have not yet satisfied the needs of the marketplace sufficiently from the viewpoint of polarization characteristics, absorption wavelength range, hue and the like. Furthermore, among polarizing plates corresponding to three primary colors for a color liquid crystal projector, that is, three polarizing plates for blue channel, for green channel, and for red channel, there are not those which are provided with all of brightness, polarization performance, durability under high temperature or high humidity condition, and light resistance to long time exposure under good balance, and its improvement is demanded.

In addition, Swiss Patent No. 326,553 discloses a trisazo compound having an unsubstituted triazole ring, but does not disclose a trisazo compound having a triazole ring with substituents.

DISCLOSURE OF THE INVENTION

An object of the present invention is to provide a polarizing plate of high performance having excellent polarization performance and humidity resistance, heat resistance and light resistance.

Another object of the present invention is to provide a neutral color polarizing plate of high performance which is produced by adsorbing two or more kinds of dichromatic dyes in a polymeric film and orientating it, and which does not cause color leakage at cross position in the wavelength range (400 to 700 nm) of visible light, and furthermore which has excellent polarization performance and humidity resistance, heat resistance and light resistance.

A further object of the present invention is to provide polarizing plates of high performance corresponding to three primary colors for a color liquid crystal projector, which are good in all of brightness, polarization performance, durability and light resistance.

In order to attain such objects the present inventors have devoted themselves to research, and consequently have found that a polarizing film and a polarizing plate which contain a specific dye, has excellent polarization performance and humidity resistance, heat resistance and light resistance, and thus have accomplished the present invention.

That is, the present invention relates to the following embodiments.

[1] An azo compound represented by the following formula (1):

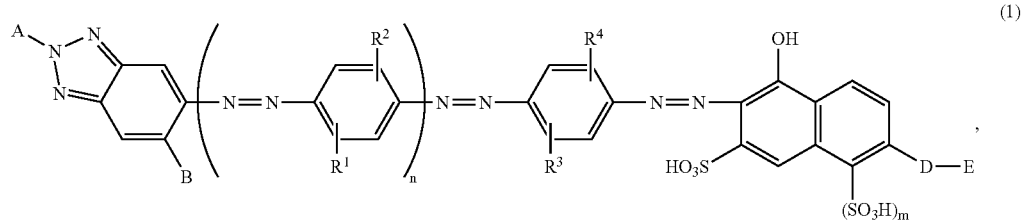

wherein A denotes a phenyl group having 1 to 3 substituents selected from the group consisting of sulfonic acid group, amino group, substituted amino groups, lower alkyl groups, lower alkoxyl groups, hydroxyl group and carboxyl group, or a naphthyl group which has 1 to 3 sulfonic acid groups as substituents and which may have hydroxyl group, B denotes hydrogen atom, sulfonic acid group, a lower alkyl group, a lower alkoxyl group, a halogen atom or nitro group, each of $R^1$ to $R^4$ independently denotes hydrogen atom, a halogen atom, a lower alkyl group, a lower alkoxyl group or acetylamino group, D denotes —NHCO—, —N=N— or —NH—, E denotes hydrogen atom, a lower alkyl group or a phenyl group having 1 to 3 substituents selected from the group consisting of hydroxyl group, amino group, nitro group, sulfonic acid group, carboxyl group, a lower alkyl group and a lower alkoxyl group, n denotes 0 or 1, and m denotes 0 or 1, or a salt thereof, or a copper complex compound of either of them.

[2] The azo compound as set forth in the above item [1], wherein A is a phenyl group having 1 to 3 substituents selected from the group consisting of sulfonic acid group, methyl group, methoxy group, hydroxyl group and carboxyl group, or a salt thereof, or a copper complex compound of either of them.

[3] The azo compound as set forth in the above item [1], wherein A is a phenyl group having as substituents 1 to 2 sulfonic acid groups, carboxyl groups, hydroxyl groups or $C_1$ to $C_5$ alkyl groups, or a naphthyl group having sulfonic acid group, B is hydrogen atom, sulfonic acid group, a $C_1$ to $C_4$ alkyl group or a $C_1$ to $C_4$ alkoxyl group, $R^1$ is a $C_1$ to $C_5$ alkyl group, a $C_1$ to $C_5$ alkoxyl group or acetylamino group, $R^2$ is hydrogen atom, a $C_1$ to $C_5$ alkyl group or a $C_1$ to $C_5$ alkoxyl group, $R^3$ is a $C_1$ to $C_5$ alkyl group or a $C_1$ to $C_5$ alkoxyl group, $R^4$ is hydrogen atom, a $C_1$ to $C_5$ alkyl group or a $C_1$ to $C_5$ alkoxyl group, D is —NHCO—, —N=N— or —NH—, and E is a phenyl group which may be substituted with amino group or hydroxyl group, or a salt thereof, or a copper complex compound of either of them.

[4] The azo compound as set forth in the above item [1], wherein A is a phenyl group having as substituents sulfonic acid group and/or carboxyl group, B is sulfonic acid group, $R^1$ is methyl group, $R^2$ is hydrogen atom, $R^3$ is methyl group, $R^4$ is methyl group or methoxy group, D is —NHCO— or —N=N—, and E is a phenyl group which may be substituted with amino group or hydroxyl group, or a salt thereof, or a copper complex compound of either of them.

[5] A dye type polarizing film containing in a polarizing film base material the azo compound as set forth in the above item [1], or a salt thereof, or a copper complex compound of either of them.

[6] A dye type polarizing film containing in a polarizing film base material the azo compound as set forth in the above item [1], or a salt thereof, or a copper complex compound of either of them, and at least one kind of an organic dye other than these compounds.

[7] The dye type polarizing film as set forth in the above item [5] or [6], wherein the polarizing film base material is a film comprising a polyvinyl alcohol resin.

[8] The dye type polarizing film as set forth in any one of the above items [5]-[7], which is used for a liquid crystal projector.

[9] A polarizing plate comprising the dye type polarizing film as set forth in any one of the above items [5]-[8].

BEST MODE FOR CARRYING OUT THE INVENTION

The azo compound of the present invention is represented by the formula (1) as stated above. In the formula (1), A denotes a phenyl group having 1 to 3 substituents selected from the group consisting of sulfonic acid group, amino group, substituted amino groups, lower alkyl groups, lower alkoxyl groups, hydroxyl group and carboxyl group, or a naphthyl group which has 1 to 3 sulfonic acid groups as substituents and which may have hydroxyl group.

When A is a phenyl group, preferably the phenyl group has 1 to 2 substituents selected from sulfonic acid group, hydroxyl group and carboxyl group, and more preferably it is substituted by one sulfonic acid group. The substituted position of sulfonic acid group is particularly preferably the meta position to triazole ring. When A is a naphthyl group, the naphthyl group is preferably substituted by 1 to 2 sulfonic acid groups, and the substituted position is preferably 6-sulfo-1-naphthyl, 7-sulfo-1-naphthyl, 6,8-disulfo-2-naphthyl, or 4,8-disulfo-2-naphthyl, more preferably 6-sulfo-1-naphthyl, or 6,8-disulfo-2-naphthyl.

In the formula (1), B denotes hydrogen atom, sulfonic acid group, a lower alkyl group, a lower alkoxyl group, a halogen atom or nitro group, preferably hydrogen atom, sulfonic acid group, methyl group, methoxy group or the like.

Each of $R^1$ to $R^4$ independently denotes hydrogen atom, a halogen atom, a lower alkyl group, a lower alkoxyl group or acetylamino group. Preferably $R^1$ and $R^2$ are each hydrogen atom or methyl group and $R^3$ and $R^4$ are each hydrogen atom, methyl group or methoxy group, and particularly preferably $R^1$ is methyl group, $R^2$ is hydrogen atom, and $R^3$ to $R^4$ are each methyl group.

Furthermore in the formula (1), D denotes —NHCO—, —N=N— or —NH—, and preferably D is —NHCO—. E denotes hydrogen atom, a lower alkyl group or a phenyl group having 1 to 3 substituents selected from the group consisting of hydroxyl group, amino group, nitro group, sulfonic acid group, carboxyl group, a lower alkyl group and a lower alkoxyl group, preferably p-aminophenyl group or p-hydroxyphenyl group.

In the present invention, "lower alkyl group" and "lower alkoxyl group" mean an alkyl group and an alkoxyl group having 1 to 5 carbons. "Alkyl group of $C_1$ to $C_4$" (an alkyl group having 1 to 4 carbons) includes methyl group, ethyl group, propyl group, isopropyl group, n-butyl group, isobutyl group, sec-butyl group, and tert-butyl group, and "alkyl group of $C_1$ to $C_5$" (an alkyl group having 1 to 5 carbons) includes methyl group, ethyl group, propyl group, isopropyl group, n-butyl group, isobutyl group, sec-butyl group, tert-butyl group, n-amyl group, isoamyl group, sec-amyl group, active amyl group or tert-amyl group. Furthermore, "alkoxy group of $C_1$ to $C_4$" (an alkoxy group having 1 to 4 carbons) includes methoxy group, ethoxy group, n-propoxy group, isopropoxy group, n-butoxy group, isobutoxy group, sec-butoxy group, and tert-butoxy group, and "alkoxy group of $C_1$ to $C_5$" (an alkoxy group having 1 to 5 carbons) includes methoxy group, ethoxy group, n-propoxy group, isopropoxy group, n-butoxy group, isobutoxy group, sec-butoxy group, tert-butoxy group, n-pentyloxy group, isopentyloxy group, sec-pentyloxy group, active pentyloxy group or tert-pentyloxy group. Moreover, the above "substituted amino group" is not particularly limited, and includes, for example, amino groups substituted by 1 to 2 lower alkyl groups, acetylamino group, phenylamino group, or benzoylamino group.

Next, specific examples of the azo compound (sulfonic acid group, carboxyl group and hydroxyl group have forms of free acids) represented by the formula (1) used in the present invention are illustrated as the following formulas (2) to (15).

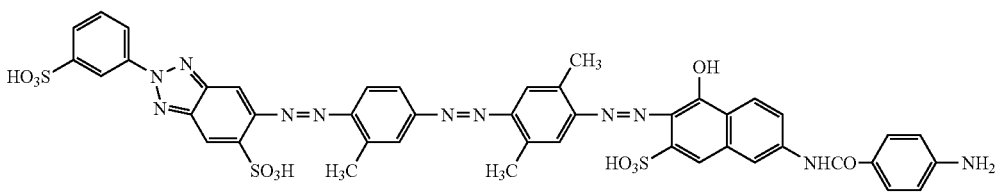

(2)

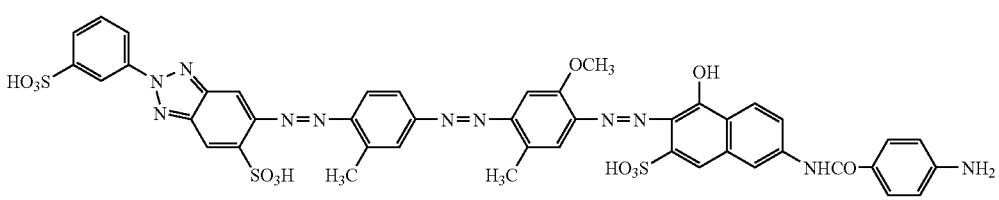

(3)

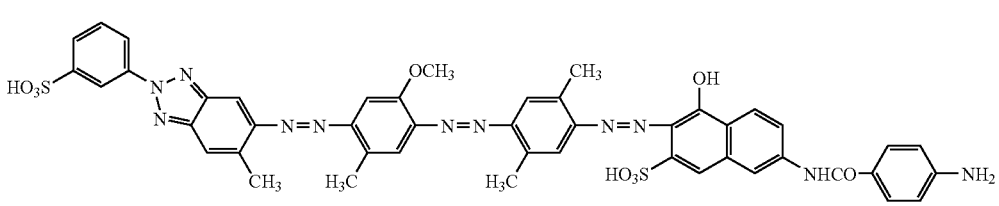

(4)

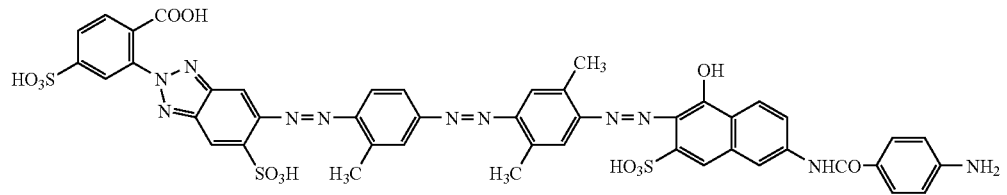
(5)
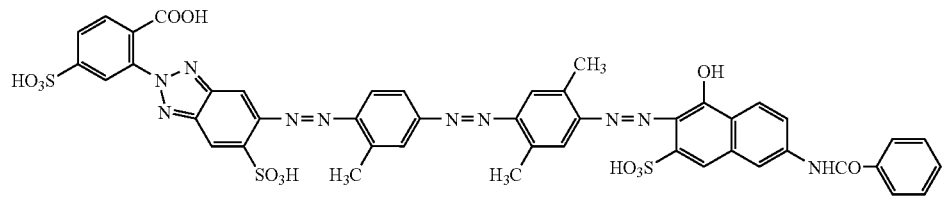
(6)
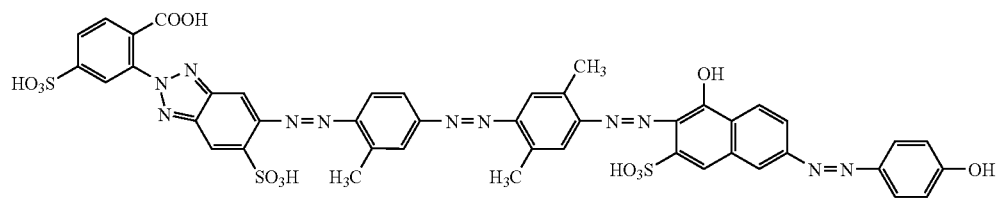
(7)
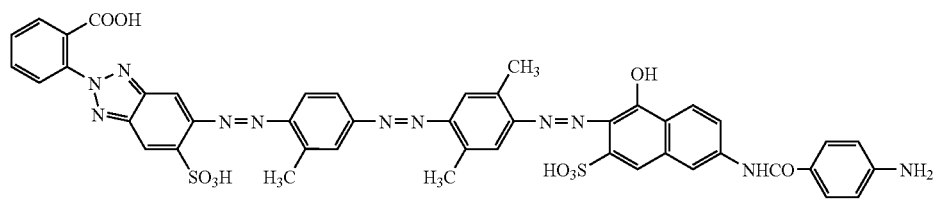
(8)
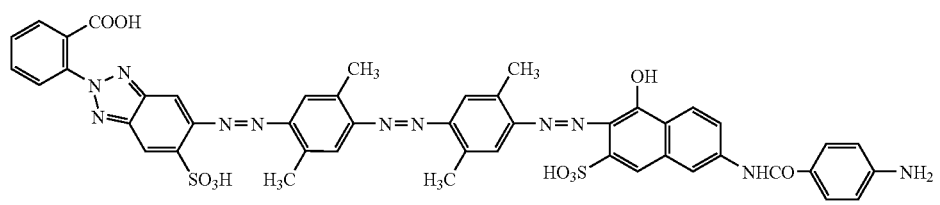
(9)

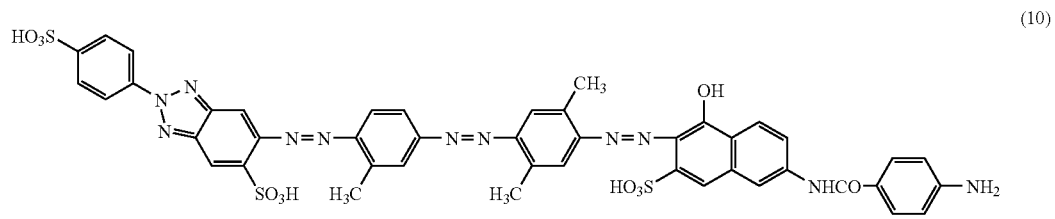
(10)
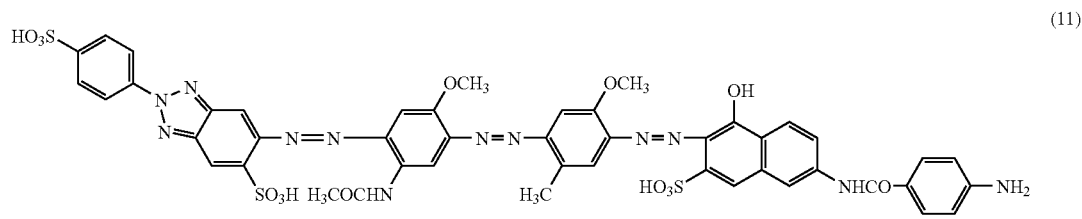
(11)
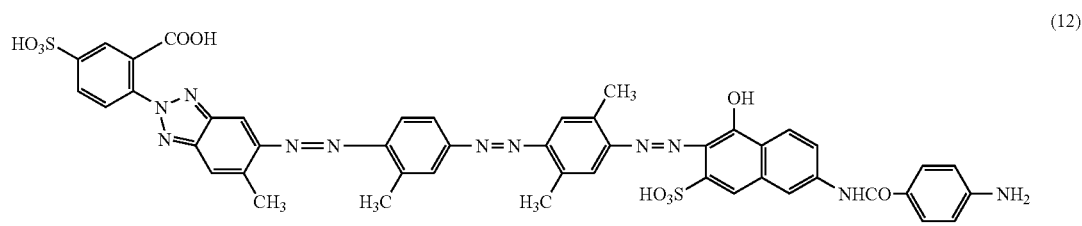
(12)
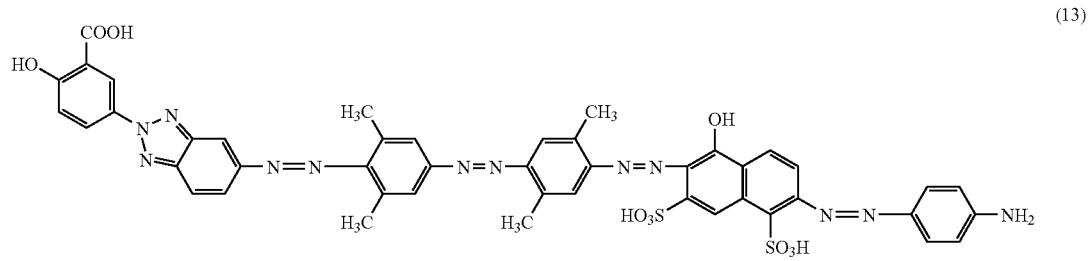
(13)
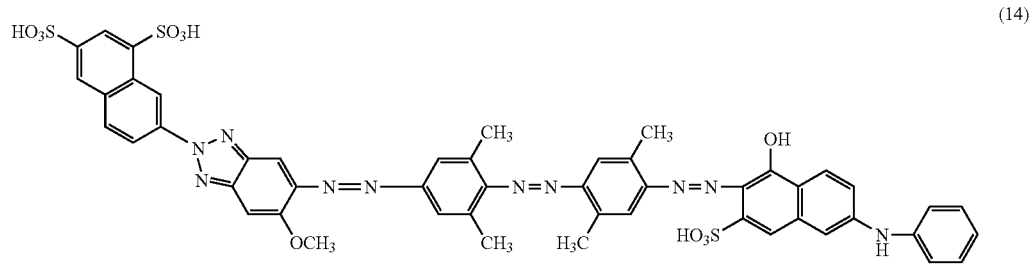
(14)

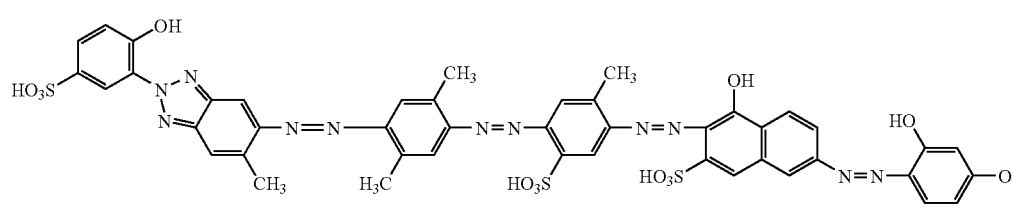
(15)

The azo compound represented by the formula (1) and the salt thereof can be easily prepared by carrying out the publicly-known diazotization, coupling and triazole formation in accordance with the usual preparation process of an azo dye as disclosed in, for example, "Dye Chemistry" (written by Yutaka Hosoda; Gihoudou). As a specific preparation process, a compound represented by the following formula (I) is diazotized and subjected to coupling with phenylenediamines represented by the following formula (II), and the resulting monoazoamino compound (the following formula (III)) is oxidized and then subjected to triazole formation to obtain an aminotriazole compound represented by the following formula (IV).

 (I)

In the above formula, A denotes the same meaning as defined in the formula (1).

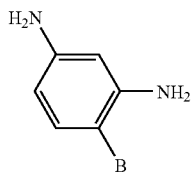 (II)

In the above formula, B denotes the same meaning as defined in the formula (1).

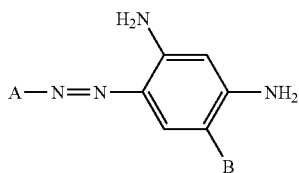 (III)

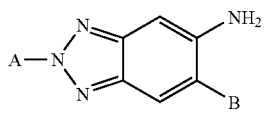 (IV)

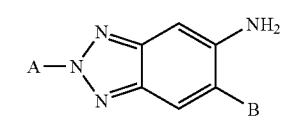 (IV)

Next, this aminotriazole compound is diazotized and subjected to primary coupling with anilines of the following formula (V) to obtain a monoazoamino compound represented by the following formula (VI).

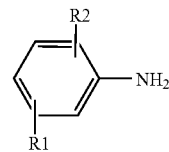 (V)

In the above formula, $R^1$ and $R^2$ denote the same meanings as defined in the formula (1).

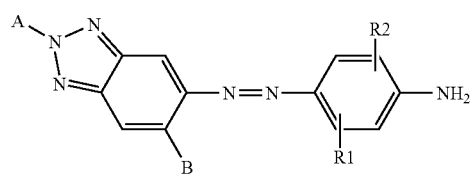 (VI)

When n is 1 in the formula (1), this monoazoamino compound is diazotized and subjected to secondary coupling with anilines represented by the following formula (VII) to obtain a disazoamino compound represented by the following formula (VIII).

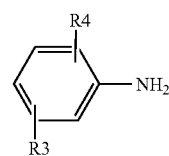 (VII)

In the above formula, $R^3$ and $R^4$ denote the same meanings as defined in the formula (1).

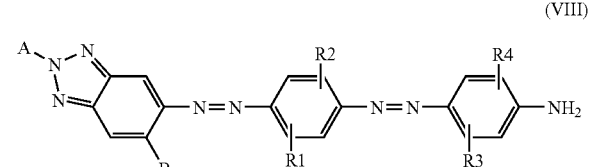 (VIII)

This disazoamino compound is diazotized and subjected to tertiary coupling with naphthols represented by the following formula (IX) to obtain an azo compound of the formula (1).

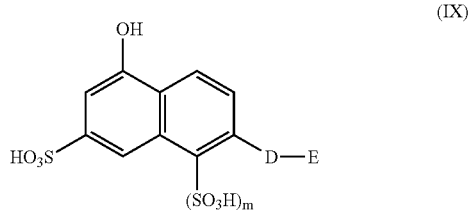

(IX)

In the above formula, D and E the same meaning as defined in the formula (1).

In addition, when n is 0 in the formula (1), the monoazoamino compound (the formula (VI)) obtained in the above process is diazotized and subjected to secondary coupling with naphthols represented by the formula (IX) to obtain an azo compound of the formula (1).

In the above reaction, diazotization step is carried out by a usual method of mixing a nitrite such as sodium nitrite into an aqueous solution or suspension of a diazo component in a mineral acid such as hydrochloric acid or sulfuric acid, or by the reverse method of previously adding a nitrite into a neutral or weakly alkaline aqueous solution of a diazo component and then mixing a mineral acid therewith. The temperature of diazotization is suitably −10 to 40° C. Furthermore, coupling step with anilines is carried out by mixing the acid aqueous solution thereof in hydrochloric acid, acetic acid or the like with the above diazo solution at a temperature of −10 to 40° C. and under the acidic condition of a pH of 2 to 7.

The monoazo compound and disazo compound obtained by coupling can be separated out as they are or by acidizing out or salting out and filtered and then taken out, or thereafter in the state of solution or suspension can proceed to the next step. When a diazonium salt is hardly soluble and in the state of suspension, it may be filtered and used as a press cake in the next coupling step.

In the above reaction, triazole formation step is carried out by adding an oxidizing agent such as copper sulfate to an aqueous solution of an azo compound in ammonia water or the like in accordance with the method as disclosed in, for example, "Dye Chemistry" (written by Yutaka Hosoda; Gihoudou; page 635).

Tertiary coupling reaction between the diazotized product of a disazoamino compound and naphthols represented by the formula (IX) is carried out at a temperature of −10 to 40° C. and under the neutral to alkaline condition of a pH of 7 to 10. After completion of the reaction, the product is separated out by salting out and filtered to take out. Furthermore, when purification is necessary, salting out is repeated or an organic solvent is used to separate the product from water. As an organic solvent used for purification, there are cited water-soluble organic solvents such as alcohols including methanol, ethanol and the like, and ketones including acetone and the like.

In addition, in the present invention, an azo compound represented by the formula (1) is used as a free acid and furthermore can be used as a salt of the azo compound. As such a salt there are cited alkali metal salts such as lithium salt, sodium salt and potassium salt, ammonium salt, amine salt, and the like. Most generally sodium salt is used.

Furthermore, in some cases there can be used a copper complex compound which has been obtained in accordance with the conventional method by using copper sulfate or the like for an azo compound or the salt thereof. As specific examples of such a copper complex compound, there are cited the following formulas (16) and (17).

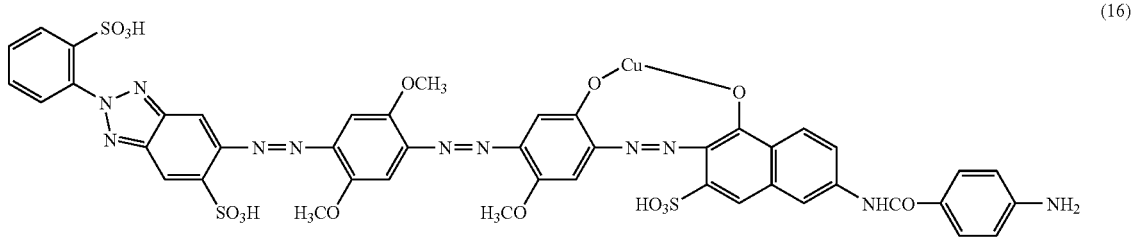

(16)

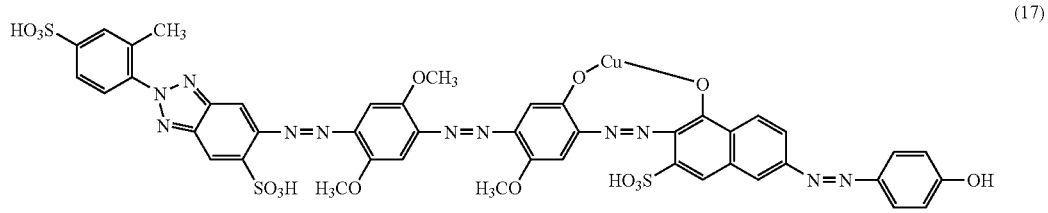

(17)

As anilines (one kind of compounds represented by the formula (I)) which are used as a starting material for synthesizing a water-soluble dye represented by the formula (1), there are cited, for example, sulfanilic acid, metanilic acid, orthanilic acid, 2-methyl-aniline-4-sulfonic acid, 2-methoxy-aniline-4-sulfonic acid, 4-acetoamino-aniline, 4-acetoamino-aniline-5-sulfonic acid, 4-aminobenzoic acid, 2-amino-4-sulfobenzoic acid, 2-amino-5-sulfobenzoic acid, and the like. Sulfanilic acid, metanilic acid, orthanilic acid, 2-methyl-aniline-4-sulfonic acid, and 2-amino-4-sulfobenzoic acid are preferable. The substituted amino group of 4-acetoamino-aniline, 4-acetoamino-aniline-5-sulfonic acid, or the like may be converted to amino group by hydrolysis in the subsequent step.

Furthermore, as naphthylamines (one kind of compounds represented by the formula (I)) which are used as a starting material, there are cited 1-aminonaphthalene-6-sulfonic acid, 1-aminonaphthalene-7-sulfonic acid, 2-aminonaphthalene-6-8-disulfonic acid, 2-aminonaphthalene-4-8-disulfonic acid, 2-aminonaphthalene-3-6-8-trisulfonic acid, 2-amino-5-hydroxynaphthalene-7-sulfonic acid, 2-amino-8-hydroxynaphthalene-6-sulfonic acid, and the like. 2-aminonaphthalene-6-8-disulfonic acid, 2-amino-5-hydroxynaphthalene-7-sulfonic acid, and 2-amino-8-hydroxynaphthalene-6-sulfonic acid are preferable.

As phenylenediamines (formula (II)) which are subjected to coupling in the first place, there are cited 1,3-phenylenediamine, 1,4-phenylenediamine, 1,3-phenylenediamine-4-sulfonic acid, 4-methyl-1,3-phenylenediamine, 4-ethyl-1,3-phenylenediamine, 4-methoxy-1,3-phenylenediamine, 4-ethoxy-1,3-phenylenediamine, 4-chloro-1,3-phenylenediamine, 4-fluoro-1,3-phenylenediamine, 4-nitro-1,3-phenylenediamine, and the like. Preferably, there are cited 1,3-phenylenediamine-4-sulfonic acid, 4-methyl-1,3-phenylenediamine, and 4-methoxy-1,3-phenylenediamine.

As substituents in anilines (formula (V) and formula (VII)) which are primary and secondary coupling components and which may have substituents ($R^1$, $R^2$ or $R^3$, $R^4$), there are cited halogen atom, methyl group, ethyl group, methoxy group, ethoxy group, and acetylamino group. One or two of these substituents may be bonded. The bonded position to amino group is 2 position, 3 position, 2 position and 5 position, 3 position and 5 position, or 2 position and 6 position, preferably 3 position, 2 position and 5 position, or 3 position and 5 position. As the anilines, there are cited, for example, aniline, 2-methylaniline, 3-methylaniline, 2-ethylaniline, 3-ethylaniline, 2,5-dimethylaniline, 2,5-diethylaniline, 2-methoxyaniline, 3-methoxyaniline, 2-methoxy-5-methylaniline, 2,5-dimethoxyaniline, 2-methoxy-5-acetylaminoaniline, 3,5-dimethylaniline, 2,6-dimethylaniline, 3,5-dimethoxyaniline, and the like. These anilines may be protected in their amino groups. As a protecting group, there is cited, for example, the ω-methanesulfonic acid group. Anilines used for primary coupling and anilines used for secondary coupling may be same as or different from each other.

As the above-mentioned naphthols represented by the formula (IX) which are used as a tertiary coupling component, there are cited 6-amino-3-sulfo-1-naphthol, 6-methylamino-3-sulfo-1-naphthol, 6-phenylamino-3-sulfo-1-naphthol, 6-benzoylamino-3-sulfo-1-naphthol, 6-(4'-aminobenzoyl)amino-3-sulfo-1-naphthol, 6-(4'-hydroxyphenylazo)-3-sulfo-1-naphthol, 6-(2',4'-dihydroxyphenylazo)-3-sulfo-1-naphthol, 6-(2'-acetylamino-4'-aminophenylazo)-3-sulfo-1-naphthol, 6-(4'-aminophenylazo)-3-sulfo-1-naphthol, 6-(4'-N-methylaminophenylazo)-3-sulfo-1-naphthol, and the like.

Furthermore, for the polarizing film or polarizing plate of the present invention, at least one kind of the azo compound represented by the formula (1) or the salt thereof or the copper complex compound of either of them is used solely, and moreover may be used together with at least one kind of other organic dye as necessary. The organic dye used together is not particularly limited, and preferable are organic dyes which have absorption characteristics in wavelength range different from the absorption wavelength range of the azo compound of the present invention or the salt thereof or the copper complex compound of either of them and which are highly dichromatic. There are cited, for example, C. I. Direct Yellow 12, C. I. Direct Yellow 28, C. I. Direct Yellow 44, C. I. Direct Orange 26, C. I. Direct Orange 39, C. I. Direct Orange 107, C. I. Direct Red 2, C. I. Direct Red 31, C. I. Direct Red 79, C. I. Direct Red 81, C. I. Direct Red 247, C. I. Direct Green 80, C. I. Direct Green 59, and organic dyes disclosed in JP-A-2001-33627, JP-A-2002-296417 and JP-A-60-156759, and the like. These organic dyes are used as free acids, alkali metal salts (for example, Na salt, K salt, and Li salt), ammonium salts or salts of amines.

When another organic dye is used together as necessary, the kind of the organic dye incorporated is different depending on whether the target polarizing film is a neutral color polarizing film, a color polarizing film for a liquid crystal projector, or another color polarizing film, respectively. The proportion incorporated is not particularly limited, and generally one or more kinds of the above organic dyes are preferably used totally in the range of 0.1 to 10 parts by weight on the basis of the weight of at least one kind of the azo compound of the formula (1) or the salt thereof or the copper complex compound of either of them.

The polarizing film of the present invention having various hues and neutral color can be produced by incorporating at least one kind of the azo compound represented by the formula (1) or the salt thereof or the copper complex compound of either of them together with another organic dye as necessary into a polymer film as a polarizing film material (base material) in the publicly-known method.

The base material (polymer film) used for the polarizing film of the present invention is not particularly limited, and a polyvinyl alcohol type base material is preferable. As a polyvinyl alcohol type base material, there are cited, for example, polyvinyl alcohol or the derivatives thereof, and those which are produced by modifying either of them with an olefin such as ethylene or propylene, or an unsaturated carboxylic acid such as crotonic acid, acrylic acid, methacrylic acid or maleic acid, or the like. Above all, a film consisting of polyvinyl alcohol or the derivatives thereof is preferably used from the viewpoints of adsorptivity of dyes and orientation.

In incorporating into such a polymer film at least one kind of the azo compound of the formula (1) or the salt thereof or the copper complex compound of either of them, usually a method of dyeing a polymer film is adopted. Dyeing is carried out, for example, as follows. First, the compound of the present invention and another organic dye as necessary are dissolved in water to prepare a dye bath. The dye concentration in the dye bath is not particularly limited and usually selected from the range of approximately 0.001 to 10% by weight. Furthermore, if necessary a dyeing assistant may be used, and, for example, Glauber's salt is preferably used in the concentration of approximately 0.1 to 10% by weight. Dyeing is carried out by immersing a polymer film in the dye bath thus prepared for 1 to 10 minutes. Dyeing temperature is preferably about 40 to 80° C.

Orientation of a water-soluble dye is carried out by stretching the polymer film dyed as stated above. As a stretching method, any of publicly-known methods such as wet method and dry method may be used. In some cases, stretching of a polymer film may be carried out before dyeing. In this case, orientation of a water-soluble dye is carried out at the time of dyeing. The polymer film wherein a water-soluble dye is incorporated and orientated, is subjected to after-treatment such as boric acid treatment by the publicly-known method as necessary. Such after-treatment is carried out in order to improve light transmittance and polarization degree of the polarization film. The conditions of boric acid treatment are different depending on the kind of the polymer film used and the kind of the dye used. In general, the concentration of boric acid aqueous solution is in the range of 0.1 to 15% by weight, preferably 1 to 10% by weight, and the treatment is carried out by the immersion at a temperature range of 30 to 80° C., preferably 40 to 75° C. for 0.5 to 10 minutes. Furthermore as needed, fix treatment may be carried out with an aqueous solution containing a cationic high-molecular compound.

A protective film excellent in optical transparency and mechanical strength can be affixed to the one side or both sides of the dye type polarizing film of the present invention thus obtained to produce a polarizing plate. As a material forming a protective film, there are used, for example, cellulose acetate type film, acrylic film, fluorine type film such as tetrafluoroethylene/hexafluoropropylene type copolymer, film consisting of polyester resin, polyolefin resin or polyamide type resin, and the like.

Furthermore, a transparent protective layer may be provided on the surface of the polarizing plate of the present invention. As a protective layer, there are cited, for example, acrylic or polysiloxane type hard coat layer, urethane type protective layer, and the like. Moreover, in order to more improve single plate light transmittance, it is preferable to provide an AR layer on this protective layer. The AR layer can be formed, for example, by vapor deposition or sputtering treatment of a substance such as silicon dioxide or titanium oxide, or by thinly coating a fluorine type substance. In addition, the polarizing plate of the present invention can be used as an elliptically polarizing plate wherein a phase difference plate is affixed.

The polarizing plate of the present invention thus constituted has neutral color, causes no color leakage at cross position in the wavelength range (400 to 700 nm) of visible light, and is excellent in polarization performance. Furthermore, it has the feature that even under high temperatures and high humidity conditions it causes no discoloration or polarization performance decrement and a little light leakage at cross position in the visible light range.

The polarizing film used for the polarizing plate for a liquid crystal projector in the present invention contains as a dichromatic molecule at least one kind of the azo compound represented by the formula (1) or the salt thereof or the copper complex compound of either of them, and furthermore as needed another organic dye as stated previously, and is produced in accordance with the above-mentioned process. Next, a protective film is affixed to the polarizing film to produce a polarizing plate, which is as necessary provided with a protective layer, an AR layer, a support and the like, and used as a polarizing plate for a liquid crystal projector.

In the polarizing plate for a liquid crystal projector of the present invention, single plate average light transmittance is 39% or more and average light transmittance at cross position is 0.4% or less in the wavelength range necessary for the polarizing plate (420 to 500 nm for blue channel, 500 to 580 nm for green channel, and 600 to 680 nm for red channel). Preferably, in the wavelength range necessary for the polarizing plate, single plate average light transmittance is 41% or more and average light transmittance at cross position is 0.3% or less, more preferably 0.2% or less. Furthermore preferably, in the wavelength range necessary for the polarizing plate, single plate average light transmittance is 42% or more and average light transmittance at cross position is 0.1% or less. Thus, the color polarizing plate for a liquid crystal projector of the present invention has brightness and excellent polarization performance at the same time.

As the polarizing plate for a liquid crystal projector of the present invention, preferable is the polarizing plate with an AR layer which is obtained by providing the above-mentioned AR layer on the polarizing plate consisting of the polarizing film and a protective film, and more preferable is the polarizing plate with an AR layer and a support which is obtained by affixing the polarizing plate with an AR layer furthermore to a support such as a transparent glass sheet.

In addition, single plate average light transmittance is the average value of light transmittance in a specific wavelength range when natural light is allowed to impinge on one polarizing plate wherein an AR layer and a support such as a transparent glass sheet are not provided (hereinafter the mere expression "polarizing plate" has the similar meaning). Average light transmittance at cross position is the average value of light transmittance in a specific wavelength range when natural light is allowed to impinge on two polarizing plates wherein orientation directions are adjusted at cross position.

The polarizing plate for a liquid crystal projector of the present invention is used usually as a polarizing plate with a support. The support preferably has a flat because the polarizing plate is affixed thereto, and preferably consists of a glass molding because of optical use. As the glass molding, there are cited, for example, glass sheet, lens, prism (for example, triangle prism or cubic prism), and the like. A lens affixed with a polarizing plate can be used as a condenser lens with a polarizing plate in a liquid crystal projector. A prism affixed with a polarizing plate can be used as a polarization beam splitter with a polarizing plate or a dichroic prism with a polarizing plate in a liquid crystal projector. Furthermore, a polarizing plate may be affixed to a liquid crystal cell. As the glass material, there are cited inorganic glasses such as soda glass, borosilicate glass and sapphire glass, organic glasses such as acrylics and polycarbonate, and the like, and preferable are inorganic glasses. As the thickness and size of a glass sheet, any thickness and any size are suitable. Incidentally, in order to further improve single plate light transmittance, it is preferable to provide an AR layer on either one surface or both surfaces of the glass surface and polarizing plate surface of a polarizing plate with a glass.

In order to produce a polarizing plate with a support for a liquid crystal projector, for example, a transparent adhesive (or pressure sensitive adhesive) is coated on the flat of a support and then the polarizing plate of the present invention is affixed to this coated surface. In addition, a transparent adhesive (or pressure sensitive adhesive) is coated on the polarizing plate and then a support may be affixed to this coated surface. As the adhesive (or pressure sensitive adhesive) used herein, for example, acrylic acid ester type is preferable. In addition, when this polarizing plate is used as an elliptically polarizing plate, usually a phase difference plate is affixed to the support side, but a glass molding may be affixed to the polarizing plate side.

In a color liquid crystal projector using the polarizing plate of the present invention, in the case of green channel portion, the polarizing plate of the present invention is arranged at either one or both of the incident side and outgoing side of the liquid crystal cell. The polarizing plate may be contacted with the liquid crystal cell or may not be contacted with it, but preferably is not contacted with it from the viewpoint of durability. In the system wherein a PBS (polarizing beam splitter) is used behind light source, as a polarizing plate at the incident side an iodine type polarizing plate may be used, or the polarizing plate of the present invention may be used. When a polarizing plate is contacted with the liquid crystal cell at the outgoing side, there can be used the polarizing plate of the present invention having the liquid crystal cell as a support. When a polarizing plate is not contacted with the liquid crystal cell, preferably there is used the polarizing plate of the present invention using a support other than the liquid crystal cell. Furthermore, from the viewpoint of durability, preferably the polarizing plate of the present invention is arranged at both of the incident side and outgoing side of the liquid crystal cell, and moreover preferably the polarizing plate surface of the polarizing plate of the present invention is arranged at the liquid crystal cell side, and the support surface thereof is arranged at the light source side. In addition, the incident side of the liquid crystal cell means the light source side, and the opposite side is referred to as the outgoing side.

In a color liquid crystal projector using the polarizing plate of the present invention, preferably an ultraviolet light-cutting filter is arranged between the light source and said incident side of the polarizing plate with a support. Furthermore, the liquid crystal cell used is, for example, active matrix type, and it is preferably formed by encapsulating liquid crystal between a transparent substrate wherein an electrode and a TFT (thin film transistor) are formed and another transparent substrate wherein the counter electrode is formed. Light emitted from a light source such as a metal halide lamp is passed through an ultraviolet light-cutting filter, and separated into three primary colors, which are then passed through the color polarizing plates with supports of the present invention for channels of blue, green and red, and then integrated, and the integrated light is expanded by a projector lens and projected onto a screen.

The polarizing plate for a color liquid crystal projector thus constituted has the characteristic feature that it is excellent in polarization performance, and furthermore that even under high temperatures and high humidity conditions it causes no discoloration or polarization performance decrement.

EXAMPLES

Hereinafter, the present invention is described in more detail by way of working examples, but these are exemplificative and do not limit the present invention at all. Part and % in Examples are based on weight, unless otherwise noted.

Example 1

17.3 parts of 3-aminobenzenesulfonic acid was added to 500 parts of water, and dissolved with sodium hydroxide. Cooling was carried out to 10° C. or lower, 32 parts of 35% hydrochloric acid was added, then 6.9 parts of sodium nitrite was added, and stirring was carried out for 1 hour at 5 to 10° C. 18.8 parts of 2,4-diaminobenzenesulfonic acid was added thereto, sodium carbonate was added while stirring at 10 to 15° C. to make the pH 3, and further stirring was carried out to complete the coupling.

200 parts of 28% ammonia water and 125 parts of copper sulfate pentahydrate were added to this aqueous reaction product solution, and stirring was carried out for 0.5 hour at 80° C. to produce a triazole compound. To 37.0 parts of the resultant triazole compound were added 32 parts of 35% hydrochloric acid and then 6.9 parts of sodium nitrite respectively, and stirring was carried out for 2 hours at 25 to 30° C. 10.9 parts of 3-methylaniline dissolved in diluted aqueous hydrochloric acid solution was added thereto, sodium carbonate was added while stirring at 20 to 30° C. to make the pH 3, further stirring was carried out to complete the coupling reaction, and filtration was carried out to obtain a monoazo compound.

To the resultant monoazo compound were added 32 parts of 35% hydrochloric acid and then 6.9 parts of sodium nitrite, and stirring was carried out for 2 hours at 25 to 30° C. 12.1 parts of 2,5-dimethylaniline dissolved in diluted aqueous hydrochloric acid solution was added thereto, sodium carbonate was added while stirring at 20 to 30° C. to make the pH 3, further stirring was carried out to complete the coupling reaction, and filtration was carried out to obtain a disazo compound represented by the following formula (18).

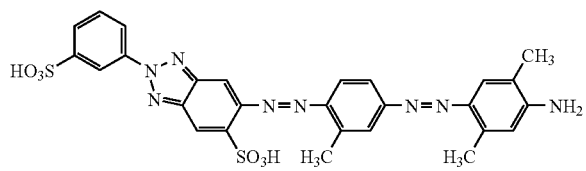

(18)

15 parts of the disazo compound of the above formula (18) was dispersed in 600 parts of water, then 32 parts of 35% hydrochloric acid and then 6.9 parts of sodium nitrite were added, and stirring was carried out for 2 hours at 25 to 30° C. to carry out the diazotization.

On the other hand, 35.8 parts of 6-(4'-aminobenzoyl) amino-3-sulfo-1-naphthol was added to 250 parts of water, and the mixture was made alkalescent with sodium carbonate to be dissolved. Into this solution was poured the diazotization product of the disazo compound previously obtained while keeping a pH of 7 to 10, and stirring was carried out to complete the coupling reaction. Salting out was carried out with sodium chloride, and filtration was carried out to obtain the sodium salt of a trisazo compound represented by the above formula (2). This compound salt expressed red. 20% aqueous pyridine solution of this compound salt had a maximum absorption wavelength of 547 nm as measured by a spectrophotometer (V-530 manufactured by JASCO Corporation).

Example 2

Similarly to Example 1 except that the secondary coupler in the compound represented by the above formula (18) was changed to 13.7 parts of 2-methoxy-5-methylaniline from 12.1 parts of 2,5-dimethylaniline, there was obtained the sodium salt of a trisazo compound represented by the formula (3) previously cited. This compound salt expressed reddish violet. 20% aqueous pyridine solution of this compound salt had a maximum absorption wavelength of 566 nm as measured by a spectrophotometer (V-530 manufactured by JASCO Corporation).

Example 3

Similarly to Example 1 except that there was used the disazo compound represented by the following formula (19) which was synthesized by changing the starting material to 21.7 parts of 2-amino-4-sulfo-benzoic acid from 17.3 parts of 3-aminobenzenesulfonic acid, there was obtained the sodium salt of a trisazo compound represented by the above formula (5).

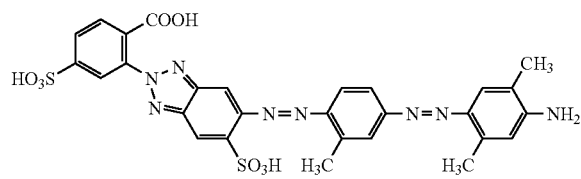

(19)

This compound salt expressed red. 20% aqueous pyridine solution of this compound salt had a maximum absorption wavelength of 544 nm as measured by a spectrophotometer (V-530 manufactured by JASCO Corporation).

Example 4

Similarly to Example 1 except that there was used the disazo compound represented by the following formula (20) which was synthesized by changing the starting material to 13.7 parts of 2-aminobenzoic acid from 17.3 parts of 3-aminobenzenesulfonic acid, there was obtained the sodium salt of a trisazo compound represented by the above formula (8).

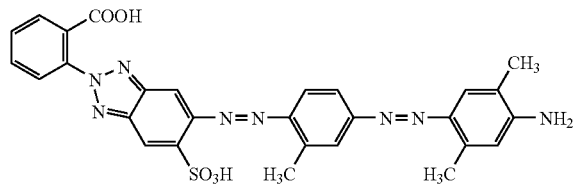

(20)

This compound salt expressed red. 20% aqueous pyridine solution of this compound salt had a maximum absorption wavelength of 540 nm as measured by a spectrophotometer (V-530 manufactured by JASCO Corporation).

Example 5

Similarly to Example 1 except that there was used the disazo compound represented by the following formula (21) which was synthesized by changing the starting material to 17.3 parts of 4-aminobenzenesulfonic acid from 17.3 parts of 3-aminobenzenesulfonic acid, there was obtained the sodium salt of a trisazo compound represented by the above formula (10).

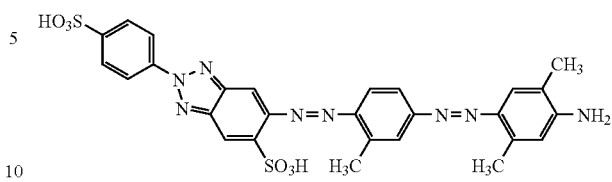

(21)

This compound salt expressed red. 20% aqueous pyridine solution of this compound salt had a maximum absorption wavelength of 540 nm as measured by a spectrophotometer (V-530 manufactured by JASCO Corporation).

Example 6

15 parts of the disazo compound of the above formula (19) was dispersed in 600 parts of water, then 32 parts of 35% hydrochloric acid and then 6.9 parts of sodium nitrite were added, and stirring was carried out for 2 hours at 25 to 30° C. to carry out the diazotization. On the other hand, 34.3 parts of 6-benzoylamino-3-sulfo-1-naphthol was added to 250 parts of water, and the mixture was made alkalescent with sodium carbonate to be dissolved. Into this solution was poured the diazotization product of the disazo compound previously obtained while keeping a pH of 7 to 10, and stirring was carried out to complete the coupling reaction. Salting out was carried out with sodium chloride, and filtration was carried out to obtain the sodium salt of a trisazo compound represented by the above formula (6). This compound salt expressed red. 20% aqueous pyridine solution of this compound salt had a maximum absorption wavelength of 547 nm as measured by a spectrophotometer (V-530 manufactured by JASCO Corporation).

Example 7

15 parts of the disazo compound of the above formula (19) was dispersed in 600 parts of water, then 32 parts of 35% hydrochloric acid and then 6.9 parts of sodium nitrite were added, and stirring was carried out for 2 hours at 25 to 30° C. to carry out the diazotization.

On the other hand, 34.4 parts of a naphthol compound represented by the following formula (22) was added to 250 parts of water, and the mixture was made alkalescent with sodium carbonate to be dissolved.

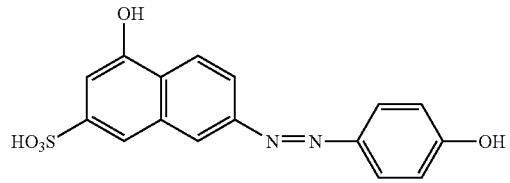

(22)

Into this solution was poured the diazotization product of the disazo compound previously obtained while keeping a pH of 7 to 10, and stirring was carried out to complete the coupling reaction. Salting out was carried out with sodium chloride, and filtration was carried out to obtain the sodium salt of a trisazo compound represented by the above formula (7).

This compound salt expressed red. 20% aqueous pyridine solution of this compound salt had a maximum absorption wavelength of 561 nm as measured by a spectrophotometer (V-530 manufactured by JASCO Corporation).

Example 8

21.7 parts of 2-amino-5-sulfobenzoic acid was added to 500 parts of water, and dissolved with sodium hydroxide. Cooling was carried out to 10° C. or lower, 32 parts of 35% hydrochloric acid was added, then 6.9 parts of sodium nitrite was added, and stirring was carried out for 1 hour at 5 to 10° C. 12.2 parts of 4-methyl-1,3-phenylenediamine was added thereto, sodium carbonate was added while stirring at 10 to 15° C. to make the pH 3, and further stirring was carried out to complete the coupling. 200 parts of 28% ammonia water and 125 parts of copper sulfate pentahydrate were added to this aqueous reaction product solution, and stirring was carried out for 0.5 hour at 80° C. to produce a triazole compound.

Similarly to Example 1 except that there was used the triazole compound obtained as stated above, there was obtained the sodium salt of a trisazo compound represented by the above formula (12). This compound salt expressed red. 20% aqueous pyridine solution of this compound salt had a of 547 nm as measured by a spectrophotometer (V-530 manufactured by JASCO Corporation).

Example 9

A polyvinyl alcohol base material of 75 μm in thickness was immersed for 4 minutes in an aqueous solution of 45° C. having 0.03% concentration of the sodium salt of the trisazo compound represented by the above formula (2) which was obtained in Example 1 and 0.1% concentration of Glauber's salt. This film was stretched 5 times at 50° C. in a 3% aqueous boric acid solution, and washed with water and dried while keeping the tense condition to obtain a polarizing film. The resultant polarizing film expressed red and had a maximum absorption wavelength of 550 nm. The maximum absorption wavelength and polarization efficiency of the resultant polarizing film are shown in Table 1. Herein, the maximum absorption wavelength of a polarizing film is the maximum absorption wavelength as measured by use of a spectrophotometer (U-4100 manufactured by Hitachi, Ltd.) in the state (cross position) wherein the two polarizing films obtained as stated above are superimposed on each other so that their orientation directions can be crossed. Furthermore, the polarizing efficiency is determined by measuring transmittance ($T_p$) in the state (parallel position) wherein two polarizing films are superimposed on each other so that their orientation directions can be paralleled, and transmittance ($T_c$) at cross position by use of the above spectrophotometer and calculating the following formula (*). As shown in Table 1, the polarizing film prepared by use of the above compound had a high polarizing efficiency. Moreover, this polarizing film showed durability for a long period of time even under high temperatures and high humidity conditions.

$$\text{Polarizing efficiency} = [(T_p - T_c)/(T_p + T_c)]^{1/2} \times 100(\%) \quad (*)$$

Examples 10 to 16

Similarly to Example 9, polarizing films were obtained by use of the azo compound sodium salts obtained in the above Examples 2-8 in place of the sodium salt of the compound represented by the above formula (2) which was obtained in Example 1. In Example 10, there was used the sodium salt of the compound represented by the above formula (3) which was obtained in Example 2. In Example 11, there was used the sodium salt of the compound represented by the above formula (5) which was obtained in Example 3. In Example 12, there was used the sodium salt of the compound represented by the above formula (8) which was obtained in Example 4. In Example 13, there was used the sodium salt of the compound represented by the above formula (10) which was obtained in Example 5. In Example 14, there was used the sodium salt of the compound represented by the above formula (6) which was obtained in Example 6. In Example 15, there was used the sodium salt of the compound represented by the above formula (7) which was obtained in Example 7. In Example 16, there was used the sodium salt of the compound represented by the above formula (12) which was obtained in Example 8. The maximum absorption wavelengths and polarization degrees of the resultant polarizing films are shown in Table 1. As shown in Table 1, the polarizing films prepared by use of these compounds had high polarization degrees.

TABLE 1

| | Maximum absorption wavelength (nm) | Polarizing efficiency (%) |
|---|---|---|
| Example 9 | 550 | 99.9 |
| Example 10 | 570 | 99.9 |
| Example 11 | 550 | 99.9 |
| Example 12 | 550 | 99.9 |
| Example 13 | 550 | 99.9 |
| Example 14 | 550 | 99.9 |
| Example 15 | 590 | 99.9 |
| Example 16 | 560 | 99.9 |

Examples 17 to 22

With regard to the polarizing films obtained in Examples 9 to 14, there were measured variations of polarization degree between before and after light irradiation for 432 hours by use of an accelerated xenon arc fade meter manufactured by Wacom electric Co., Ltd. (variation of polarization degree (%)=polarization degree (%) before light irradiation−polarization degree (%) after light irradiation). In Example 17 there was used the polarizing film obtained in Example 9. In Example 18 there was used the polarizing film obtained in Example 10. In Example 19 there was used the polarizing film obtained in Example 11. In Example 20 there was used the polarizing film obtained in Example 12. In Example 21 there was used the polarizing film obtained in Example 13. In Example 22 there was used the polarizing film obtained in Example 14. Variations of polarization degree between before and after light irradiation in these Examples are as shown in Table 2, and thereby it was found that the polarizing film of the present invention was excellent also in light resistance against exposure for a long period of time. Furthermore, in these Examples excellent light resistance was obtained as compared with Comparative Example 1 shown next.

Comparative Example 1

With regard to a polarizing film prepared similarly to Example 9 except that the compound represented by the structure of the following formula (23) disclosed in the aforementioned JP A 2001-33627 was used in place of the sodium salt of the compound represented by the above formula (2) which was obtained in Example 1, there was measured variation of polarization degree between before and after light irradiation for 432 hours by use of an accelerated xenon arc fade meter manufactured by Wacom electric Co., Ltd. The result is as shown in Table 2.

dried while keeping the tense condition to obtain a polarizing film of neutral color (gray at parallel position and black at cross position). The resultant polarizing film had a single plate average light transmittance of 41%, an average light transmittance at cross position of 0.1% or less, and a high polarization degree. Furthermore, it showed durability for a long period of time even under high temperatures and high humidity.

TABLE 2

(23)

[Structure of compound (23)]

| | Variation of polarization degree (%) |
|---|---|
| Example 17 | 0.16 |
| Example 18 | 0.67 |
| Example 19 | 0.08 |
| Example 20 | 0.30 |
| Example 21 | 0.27 |
| Example 22 | 0.16 |
| Comparative Example 1 | 1.04 |

Example 23

A polyvinyl alcohol base material of 75 μm in thickness was immersed for 4 minutes in an aqueous solution of 45° C. having 0.04% concentration of the sodium salt of the compound represented by the above formula (2) which was obtained in Example 1, 0.04% concentration of C. I. Direct Red 81, 0.03% concentration of C. I. Direct Orange 39, 0.03% concentration of the compound represented by the following structural formula (16) disclosed in the aforementioned JP A 60-156759, and 0.1% concentration of Glauber's salt. This film was stretched 5 times at 50° C. in a 3% aqueous boric acid solution, and washed with water and

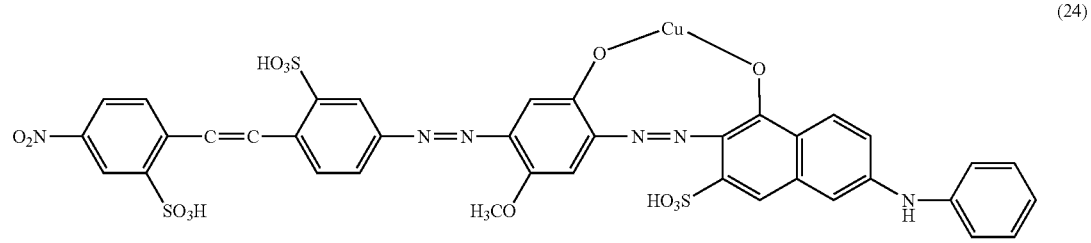

(24)

Example 24

A polyvinyl alcohol base material of 75 μm in thickness was immersed for 4 minutes in an aqueous solution of 45° C. having 0.08% concentration of the sodium salt of the compound represented by the above formula (2) which was obtained in Example 1, 0.03% concentration of C. I. Direct Orange 39, and 0.1% concentration of Glauber's salt. This film was stretched 5 times at 50° C. in a 3% aqueous boric acid solution, and washed with water and dried while keeping the tense condition to obtain a polarizing film. A TAC film (film thickness: 80 μm, trade name: TD-80U, manufactured by Fuji Photo Film Co., Ltd.) was formed on the one surface of the resultant polarizing film, and a film consisting of the similar TAC film wherein a UV curable hard coat layer of about 10 μm was formed on the one side, was affixed to the other surface of the polarizing film by use of a PVA type adhesive to obtain the polarizing plate of the present invention. An acrylic acid ester type pressure-sensitive adhesive was provided on the one side of this polarizing plate to produce the polarizing plate with a pressure-sensitive adhesive layer, and furthermore AR (anti-reflection) multi-coat processing was carried out on the outside of the hard coat layer by vacuum deposition. The resultant polarizing plate was cut into a size of 30 mm×40 mm, and affixed to a transparent glass sheet of the same size with an AR layer on the one side to obtain the polarizing plate of the present invention with an AR support (for green channel of a liquid crystal projector). The polarizing plate of this Example had a maximum absorption wavelength (λmax) of 552 nm, a single plate average light transmittance in 500 to 580 nm of 45.5%, an average light transmittance at cross position of 0.16%, and a high polarization degree, and furthermore showed durability for a long period of time even under high temperatures and high humidity conditions. Moreover, light resistance against exposure for a long period of time was also excellent.

In addition, the maximum absorption wavelength (λmax) herein means the maximum absorption wavelength in the state (cross position) wherein two polarizing films dyed with a dichromatic dye which is the azo compound represented by the above formula (1) or the salt thereof or the copper complex compound of either of them, are superimposed on each other so that their orientation directions can be crossed.

Example 25

A polyvinyl alcohol base material of 75 μm in thickness was immersed for 4 minutes in an aqueous solution of 45° C. having 0.08% concentration of the sodium salt of the compound represented by the above formula (5) which was obtained in Example 3, 0.03% concentration of C. I. Direct Orange 39, and 0.1% concentration of Glauber's salt. This film was stretched 5 times at 50° C. in a 3% aqueous boric acid solution, and washed with water and dried while keeping the tense condition to obtain a polarizing film. Similarly to Example 24 by use of the resultant polarizing film, there was obtained the polarizing plate of the present invention with an AR support (for green channel of a liquid crystal projector). The polarizing plate of this Example had a maximum absorption wavelength (λmax) of 550 nm, a single plate average light transmittance in 500 to 580 nm of 44.5%, an average light transmittance at cross position of 0.11%, and a high polarization degree, and furthermore showed durability for a long period of time even under high temperatures and high humidity conditions. Moreover, light from a UHP lamp (ultra-high pressure mercury lamp) of 200 W used for the light source of the projector was transformed into polarized light by a PBS (polarizing beam splitter), then light of 495 to 595 nm was selectively taken out therefrom, and said polarizing plate was installed in the arrangement wherein the plate can absorb the light. Variation of polarization degree in 550 nm between before and after light irradiation for 570 hours (variation of polarization degree (%)=polarization degree (%) before light irradiation−polarization degree (%) after light irradiation) was 1.07%, and showed a high light resistance as compared with Comparative Example 2 shown next.

Comparative Example 2

A polarizing plate was obtained similarly to Example 25 except that 0.06% of the sodium salt of the compound (23) shown in Comparative Example 1 was used in place of 0.08% of the sodium salt of the compound represented by the above formula (5) which was obtained in Example 3. Similarly to Example 25, light from a UHP lamp (ultra-high pressure mercury lamp) of 200 W used for the light source of the projector was transformed into polarized light by a PBS (polarizing beam splitter), then light of 495 to 595 nm was selectively taken out therefrom, and said polarizing plate was installed in the arrangement wherein the plate can absorb the light. Variation of polarization degree in 550 nm between before and after light irradiation for 570 hours (variation of polarization degree (%)=polarization degree (%) before light irradiation−polarization degree (%) after light irradiation) was 3.36%.

INDUSTRIAL APPLICABILITY

The azo compound of the present invention is useful as a dye for a polarizing film. And, a polarizing film containing this compound has high polarization performance comparable to that of a polarizing film using iodine, and furthermore is excellent also in durability. Therefore, a protective film is affixed to the polarizing film to produce a polarizing plate, and the polarizing plate is, as needed, provided with protective layer, AR (anti-reflection) layer, support and the like, and broadly used for liquid crystal projector, electronic calculator, clock, portable personal computer, word processor, liquid crystal television set, car navigation system, indoor and outdoor measurement hardwares and indicators, and the like. It is particularly suitable for various liquid crystal display devices and liquid crystal projector, for on-vehicle applications requiring high polarization performance and durability, and for display applications of industrial equipments used under various environments.

The invention claimed is:

1. An azo compound represented by the following formula (1):

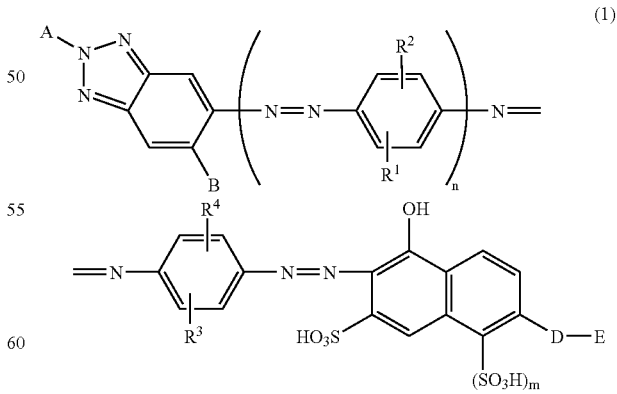

wherein A denotes a phenyl group having 1 to 3 substituents selected from the group consisting of sulfonic acid group, amino group, substituted amino groups, lower alkyl groups, lower alkoxyl groups, hydroxyl group and carboxyl group, or a naphthyl group which has 1 to 3 sulfonic acid groups as substituents and which may have hydroxyl group, B denotes hydrogen atom, sulfonic acid group, a lower alkyl group, a lower alkoxyl group, a halogen atom or nitro group, each of $R^1$ to $R^4$ independently denotes hydrogen atom, a halogen atom, a lower alkyl group, a lower alkoxyl group or acetylamino group, D denotes —NHCO—, —N=N— or —NH—, E denotes hydrogen atom, a lower alkyl group or a phenyl group having 1 to 3 substituents selected from the group consisting of hydroxyl group, amino group, nitro group, sulfonic acid group, carboxyl group, a lower alkyl group and a lower alkoxyl group, n denotes 0 or 1, and m denotes 0 or 1, or a salt thereof, or a copper complex compound of either of them.

2. The azo compound as set forth in claim 1, wherein A is a phenyl group having 1 to 3 substituents selected from the group consisting of sulfonic acid group, methyl group, methoxy group, hydroxyl group and carboxyl group, or a salt thereof, or a copper complex compound of either of them.

3. The azo compound as set forth in claim 1, wherein
A is a phenyl group having as substituents 1 to 2 sulfonic acid groups, carboxyl groups, hydroxyl groups or $C_1$ to $C_5$ alkyl groups, or a naphthyl group having a sulfonic acid group, B is hydrogen atom, sulfonic acid group, a $C_1$ to $C_4$ alkyl group or a $C_1$ to $C_4$ alkoxyl group, $R^1$ is a $C_1$ to $C_5$ alkyl group, a $C_1$ to $C_5$ alkoxyl group or acetylamino group,
$R^2$ is hydrogen atom, a $C_1$ to $C_5$ alkyl group or a $C_1$ to $C_5$ alkoxyl group, $R^3$ is a $C_1$ to $C_5$ alkyl group or a $C_1$ to $C_5$ alkoxyl group, $R^4$ is hydrogen atom, a $C_1$ to $C_5$ alkyl group or a $C_1$ to $C_5$ alkoxyl group, D is —NHCO—, —N=N— or —NH—, and E is a phenyl group which may be substituted with amino group or hydroxyl group, or a salt thereof, or a copper complex compound of either of them.

4. The azo compound as set forth in claim 1, wherein
A is a phenyl group having as substituents sulfonic acid group and/or carboxyl group, B is sulfonic acid group, $R^1$ is methyl group, $R^2$ is hydrogen atom, $R^3$ is methyl group, $R^4$ is methyl group or methoxy group, D is —NHCO— or —N=N—, and E is a phenyl group which may be substituted with amino group or hydroxyl group, or a salt thereof, or a copper complex compound of either of them.

5. A dye type polarizing film containing in a polarizing film base material the azo compound as set forth in claim 1, or a salt thereof, or a copper complex compound of either of them.

6. A dye type polarizing film containing in a polarizing film base material the azo compound as set forth in claim 1, or a salt thereof, or a copper complex compound of either of them, and at least one kind of an organic dye other than these compounds.

7. The dye type polarizing film as set forth in claim 5 or 6, wherein the polarizing film base material is a film comprising a polyvinyl alcohol type resin.

8. The dye type polarizing film as set forth in any one of claims 5 or 6, which is used for a liquid crystal projector.

9. A polarizing plate comprising the dye type polarizing film as set forth in any one of claims 5 or 6.

10. The dye type polarizing film as set forth in claims 7, which is used for a liquid crystal projector.

11. A polarizing plate comprising the dye type polarizing film as set forth in claim 7.

12. A polarizing plate comprising the dye type polarizing film as set forth in claim 8.

13. A polarizing plate comprising the dye type polarizing film as set forth in claim 10.

\* \* \* \* \*